(12) United States Patent
Higawara et al.

(10) Patent No.: US 8,248,756 B2
(45) Date of Patent: Aug. 21, 2012

(54) ELECTROCHEMICAL DEVICE AND METHOD OF MANUFACTURING THE SAME

(75) Inventors: Naoto Higawara, Takasaki (JP); Katsuei Ishida, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 983 days.

(21) Appl. No.: 12/179,510

(22) Filed: Jul. 24, 2008

(65) Prior Publication Data

US 2009/0029260 A1  Jan. 29, 2009

(30) Foreign Application Priority Data

Jul. 24, 2007  (JP) ................................. 2007-192158

(51) Int. Cl.
*H01G 9/00* (2006.01)
(52) U.S. Cl. ........................................ 361/502; 361/503
(58) Field of Classification Search ........... 361/502–503
See application file for complete search history.

(56) References Cited

U.S. PATENT DOCUMENTS

| | | | |
|---|---|---|---|
| 6,159,633 A * | 12/2000 | Yang | 429/120 |
| 2006/0222935 A1* | 10/2006 | Takahashi et al. | 429/142 |
| 2010/0136381 A1* | 6/2010 | Yang | 429/34 |

FOREIGN PATENT DOCUMENTS

| | | |
|---|---|---|
| JP | 10-064506 A | 3/1998 |
| JP | 3060540 U | 9/1999 |
| JP | 2001-102050 A1 | 4/2001 |
| JP | 2004-515083 A1 | 5/2002 |
| JP | 2002-343681 A | 11/2002 |
| JP | 3531552 B2 | 5/2004 |
| JP | 2006-278897 A | 10/2006 |
| JP | 2006-278897 A1 | 10/2006 |
| WO | W002/47097 A1 | 3/2002 |
| WO | 2010/125867 A1 | 11/2010 |

OTHER PUBLICATIONS

Notice of Reasons for Refusal issued by Japanese Patent Office, mailed Jan. 17, 2012, in the Japanese counterpart application.

* cited by examiner

*Primary Examiner* — Eric Thomas
(74) *Attorney, Agent, or Firm* — Law Office of Katsuhiro Arai (57) ABSTRACT

An electrochemical device includes four or more electrodes which are laminated with separators provided between the respective electrodes, an electrolyte filled between the respective electrodes, and a sealing member which covers the periphery. The electrodes are arranged so that the polarities alternately change in the lamination direction, and each of the electrodes has projections projecting from diagonally opposite positions on the peripheral edge so that the positions of the projections of the electrodes of different polarities are opposite to each other in the lateral direction and the projections of the electrodes of the same polarity are aligned and connected with each other.

14 Claims, 6 Drawing Sheets

ELECTROCHEMICAL DEVICE AND METHOD OF MANUFACTURING THE SAME

BACKGROUND OF THE INVENTION

1. Field of the Invention

The present invention relates to an electrochemical device such as a secondary battery, an electric double layer capacitor, or the like, and a method of manufacturing the device.

2. Description of the Related Art

So-called electrochemical devices capable of storing an electric charge, such as secondary batteries such as lithium-ion batteries and nickel halide batteries, and electrochemical capacitors such as electric double layer capacitors and redox capacitors, are widely used in, for example, electric apparatuses such as cellular phones, digital still cameras, notebook-sized personal computers, and hybrid electric automobiles.

As this type of conventional electrochemical device, for example, Japanese Unexamined Patent Application Publication No. 2006-278897 discloses an electrochemical device including a pair of current collector plates each having a main part and a tab part and disposed so that the main parts are opposed to each other, a separator having a main part and a tab part and disposed so that the main part is disposed between the main parts of the pair of current collector plates and the tab part projects from between the main parts of the pair of collector plates, an active material layer formed on each of the main parts of the pair of current collector plates so as to contact the separator, an electrolyte in contact with each of the active material layers, and an insulating fixing member for fixing the tab part of each of the collector plates and the tab part of the separator.

Japanese Patent No. 3531552 discloses an electrode structure for a multilayer battery/capacitor, in which pluralities of positive electrode plates and negative electrode plates are alternately laminated, and electrically insulating separators are interposed between the adjacent positive and negative electrode plates. Each of the separators has a positioning portion in a portion other than the contact part with the positive or negative electrode plate and including a projection formed by partially deforming the portion in the thickness direction thereof. The projection of each separator is engaged in a recess formed on the back of the projection of the adjacent separator so that the positioning portion positions the positive or negative electrode plate on each of the separators and positions the adjacent separators.

Further, Japanese Unexamined Patent Application Publication (Translation of PCT Application) No. 2004-515083 discloses a method of manufacturing a super capacitor including forming a polarizable electrode on a continuous sheet-shaped current collector and laminating a separator on the polarizable electrode which has been divided by slits.

However, the electrochemical device disclosed in Japanese Unexamined Patent Application Publication No. 2006-278897 requires the insulating fixing member for fixing the tab part of each of the collector plates and the tab part of the separator, thereby increasing the number of components and thus causing the problem of complicating the manufacturing process.

In addition, the electrochemical device disclosed in Japanese Patent No. 3531552 requires forming the projection on each separator and engaging together the projections of the adjacent separators, thereby complicating the manufacturing process.

Further, the method of manufacturing a super capacitor disclosed in Japanese Unexamined Patent Application Publication (Translation of PCT Application) No. 2004-515083 includes forming slits for dividing the polarizable electrode from one of the sides of the sheet, thereby failing to support both sides of the sheet in lamination by a roll-to-roll process and thus causing the problem of failing to stably support the sheet.

SUMMARY OF THE INVENTION

Accordingly, it is an object of at least one embodiment of the present invention to provide an electrochemical device which produces little positional deviation when electrodes and separators are alternately laminated and which can be manufactured by a roll-to-roll process, and also provide a method for manufacturing the device.

According to an embodiment of the present invention, an electrochemical device includes four or more electrodes which are laminated with separators provided between the respective electrodes, an electrolyte filled between the respective electrodes, and a sealing member which covers the periphery. The electrodes are arranged so that the polarities alternately change in the lamination direction, and each of the electrodes has projections projecting from diagonally opposite positions on the peripheral edge so that the positions of the projections of the electrodes of different polarities are opposite to each other and the projections of the electrodes of the same polarity are aligned and connected with each other. In the above, the object can be achieved.

In the electrochemical device of an embodiment of the present invention, the projections of the electrodes of one of the polarities are connected to each other, and thus the electrodes of the other polarity and the separators disposed between the electrodes of one of the polarities are supported by the electrodes of one of the polarities in a crossing manner. Similarly, the projections of the electrodes of the other polarity are connected to each other, and thus the electrodes of one of the polarities and the separators disposed between the electrodes of the other polarity are supported by the electrodes of the other polarity in a crossing manner. Therefore, in the course of or after the manufacturing process, the laminated electrodes and separators are positionally little deviating, thereby providing an electrochemical device with high reliability.

In manufacturing by a roll-to-roll process using an electrode sheet, the sheet is punched so that the projections of the electrodes are connected via connecting straps, thereby permitting the supply of the sheet while supporting both ends thereof and the stable supply of the sheet.

In the electrochemical device of an embodiment of the present invention, each of the separators preferably has projections which are positioned between the projections of the electrodes of different polarities. Therefore, even in manufacturing by a roll-to-roll process, a separator sheet is punched so that the projections of the separators are connected with connecting straps, thereby permitting the supply of the sheet while supporting both ends thereof.

Also, in any of the foregoing embodiments, it is preferred that the projections of the separators are aligned in the lamination direction and connected to each other. Since the projections of the separators are connected to each other, the movement of the electrodes and the separators can be further restricted, thereby increasing the effect of preventing positional deviation of the overlap positions.

In the electrochemical device of an embodiment of the present invention, the sealing member preferably has openings for exposing the connections of the projections of the electrodes. Therefore, the projections of the electrodes are exposed from the openings to form terminals of the electrochemical device.

In any of the foregoing embodiments, it is further preferred that each of the electrodes includes a current collector having the projections and the polarizable electrode formed on a surface thereof, and the polarizable electrodes are formed on the respective overlap surfaces of the electrodes of different polarities. Therefore, it is possible to provide an electric double layer capacitor in which a plurality of the electrodes are laminated with the separators provided between the respective electrodes.

A method for manufacturing an electrochemical device of an embodiment of the present invention is a method for manufacturing an electrochemical device including four or more electrodes which are laminated with separators provided between the respective electrodes, an electrolyte filled between the respective electrodes, and a sealing member which covers the periphery. The electrodes are arranged so that the polarities alternately change in the lamination direction and each have projections projecting from diagonally opposite positions on the peripheral edge so that the positions of the projections of the electrodes of different polarities are opposite to each other in the lateral direction and the projections of the electrodes of the same polarity are aligned and connected with each other, and the separators each having projections positioned between the projections of the adjacent electrodes of different polarities. The method includes supplying a sheet in which the electrodes are connected through connection straps for connecting the projections, supplying a sheet in which the separators are connected through connection straps for connecting the projections, supplying the sealing member in a sheet form, laminating the electrode sheet and the separator sheet, covering the resultant laminate with sheets of the sealing member, and separating the laminate into individual devices, filling the electrolyte, and sealing the laminate with the sealing member or filling the electrolyte, sealing the laminate with the sealing member, and separating the laminate into individual devices.

In the method for manufacturing the electrochemical device of an embodiment of the present invention, a sheet in which the electrodes are connected through connection straps for connecting the projections is supplied, a sheet in which the separators are connected through connection straps for connecting the projections is supplied. Therefore, the electrode sheet and the separator sheet can be stably securely supplied while both ends of each sheet are supported. In addition, the electrode sheet and the separator sheet are laminated, the resultant laminate is covered with sheets of the sealing member, and the laminate is separated into individual devices, filled with the electrolyte, and sealed with the sealing member or filled with the electrolyte, sealed with the sealing member, and separated into individual devices. Therefore, electrochemical devices can be manufactured by a roll-to-roll process with high workability.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are oversimplified for illustrative purposes and are not to scale.

DESCRIPTION OF THE PREFERRED EMBODIMENTS

An electrochemical device of an embodiment of the present invention is used for secondary batteries such as lithium-ion batteries and nickel halide batteries, and electrochemical capacitors such as electric double layer capacitors and redox capacitors, in order to store electric charge and emit the charge according to need. The electrochemical device is preferably used for electric apparatuses such as cellular phones, digital still cameras, notebook-sized personal computers, and hybrid electric automobiles.

Hereinafter, description is made of an embodiment in which the present invention is applied to an electrochemical capacitor which is one of electrochemical devices. FIGS. 1 to 6 show an embodiment in which an electrochemical device of the present invention is applied to an electric double-layer capacitor.

Figure 1:
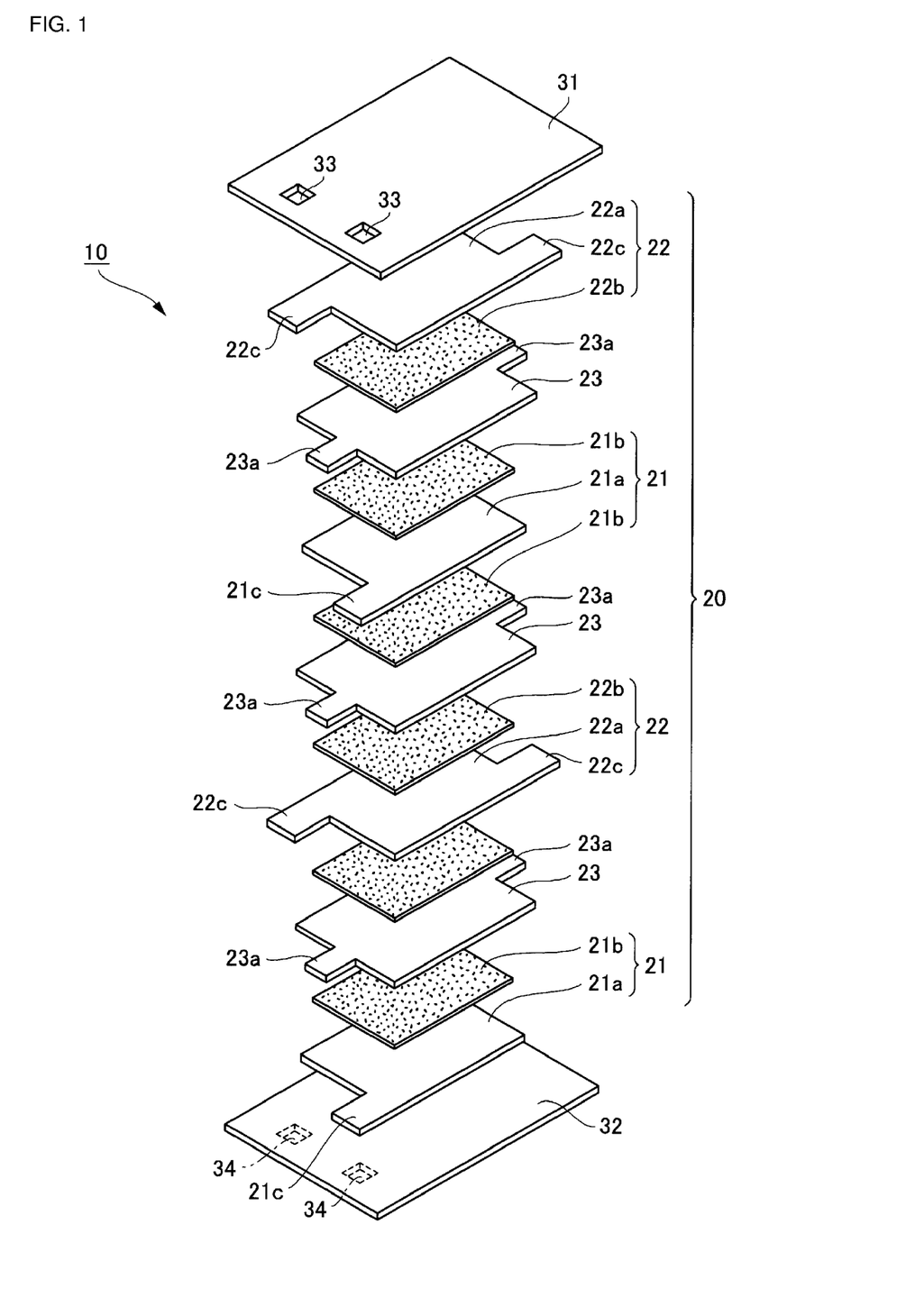
FIG. 1 is an exploded perspective view showing an electrochemical device according to an embodiment of the present invention.

As shown in FIG. 1, an electrochemical device 10 includes a laminate 20 formed by alternately laminating electrode plates 21 of one of the polarities and electrode plates 22 of the other polarity with separators 23 provided between the respective electrode plates 21 and 22. The laminate 20 is covered with sealing members 31 and 32 provided on both surfaces.

Figure 2:
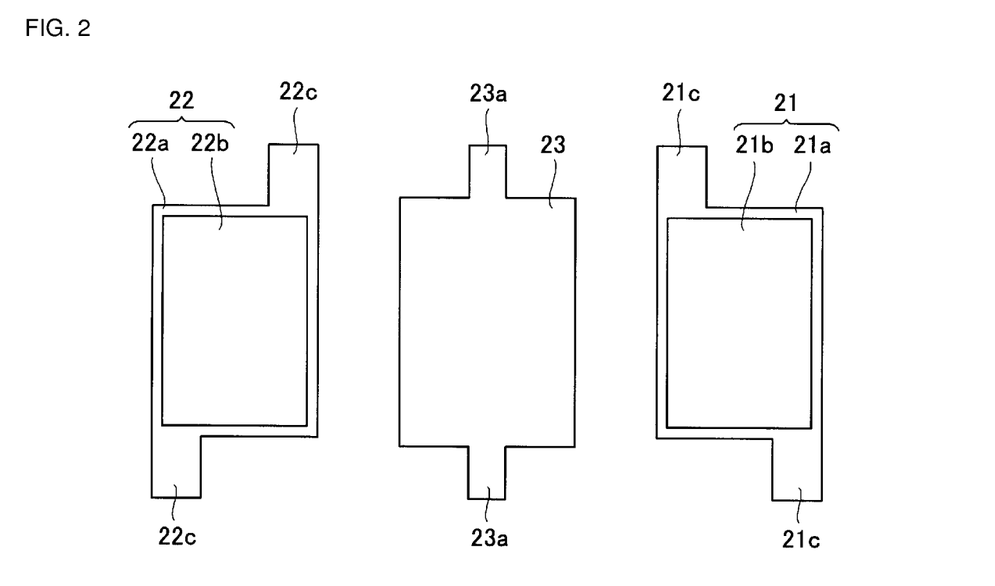
FIG. 2 is a plan view showing electrodes and a separator of the electrochemical device shown in FIG. 1.

Also referring to FIG. 2, the electrodes 21 and 22 include current collectors 21$a$ and 22$a$ and polarizable electrodes 21$b$ and 22$b$, respectively, each of the polarizable electrodes 21$b$ and 22b being formed on a predetermined region of one or both the surfaces of each current collector. The polarizable electrodes 21b and 22b are formed only on the inner surfaces of the outermost electrodes 21 and 22, respectively. In addition, the polarizable electrodes 21b and 22b are formed on both surfaces of the intermediate electrodes 21 and 22, respectively. The current collector 21a of each of the electrodes 21 of one of the polarities has projections 21c projecting from the left side of the upper side and the right side of the lower side as shown in FIG. 2. The current collector 22a of each of the electrodes 22 of the other polarity has projections 22c projecting from the right side of the upper side and the left side of the lower side as shown in FIG. 2.

As each of the current collectors 21a and 22a, for example, a metal foil, a conductive rubber, a metal fiber sheet, a metal mesh, or the like can be used. As a metal, a so-called valve metal, such as aluminum, tantalum, niobium, titanium, hafnium, zirconium, zinc, tungsten, bismuth, antimony, or the like, can be preferably used. In addition, a porous material such as activated carbon with a large surface area, carbon fibers, or the like can be used for the polarizable electrodes 21b and 22b. Although FIG. 1 shows a state in which the current collectors 21a and 22a are separated from the polarizable electrodes 21b and 22b, respectively, the polarizable electrodes 21b and 22b are actually adhered to the surfaces of the current collectors 21a and 22a, respectively, by a method such as coating or the like. The thickness of the current collector may be 10 to 100 μm, and the thickness of the polarizable electrode may be 2 to 200 μm.

Each of the separators 23 is arranged between a pair of the electrodes 21 and 22 of different polarities and has projections 23a at the centers of the upper and lower sides as shown in FIG. 2. Each of the separators 23 serves as a member for insulating a pair of the opposed electrodes 21 and 22 of different polarities from each other and for allowing ions in the electrolyte between a pair of the electrodes 21 and 22 to move therethrough. The separators 23 can be made of, for example, polyethylene, polytetrafluoroethylene (PTE), cellulose, an aramid resin, or a porous polymer film or nonwoven fabric composed of a mixture of these resins. The thickness of the separator may be 10 to 100 μm.

Figure 3:
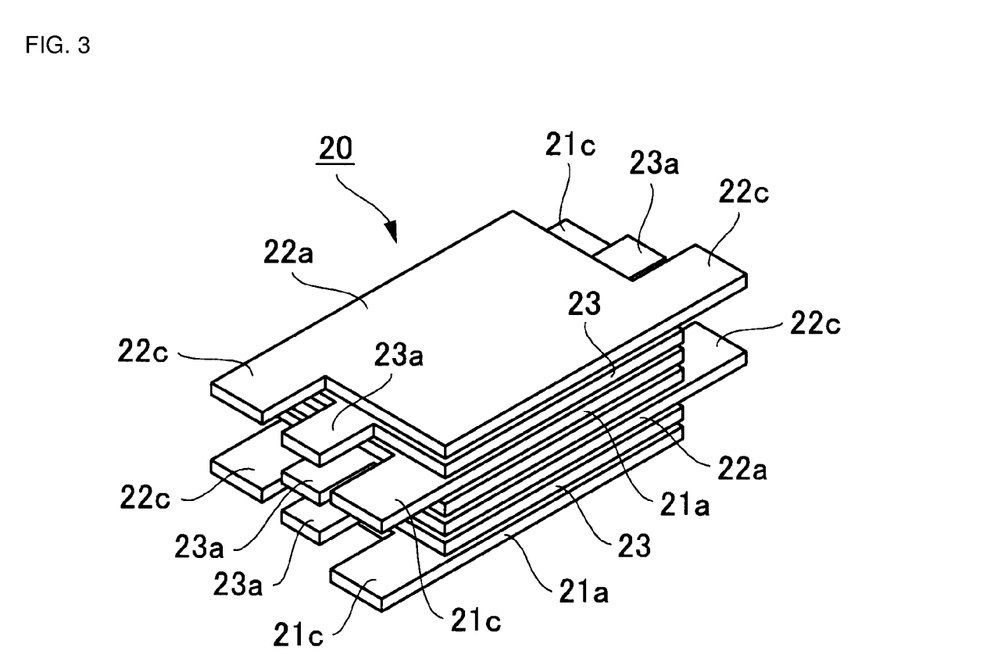
FIG. 3 is a perspective view showing a state in which the electrodes and separators of the electrochemical device are laminated.

FIG. 3 shows the laminate 20 formed by laminating the electrodes 21 and 22 and the separators 23. Each of the electrodes 21 of one of the polarities has the projections 21c projecting from the left side of the upper side and the right side of the lower side as shown in FIG. 2. Similarly, each of the electrodes 22 of the other polarity has the projections 22c projecting from the right side of the upper side and the left side of the lower side as shown in FIG. 2. The projections of the electrodes of the same polarity are aligned with each other in the vertical direction. In addition, each of the separators 23 has the projections 23a projecting from the centers of the upper and lower sides as shown in FIG. 2, and the projections 23a on each of the sides are aligned with each other in the vertical direction.

Figure 4:
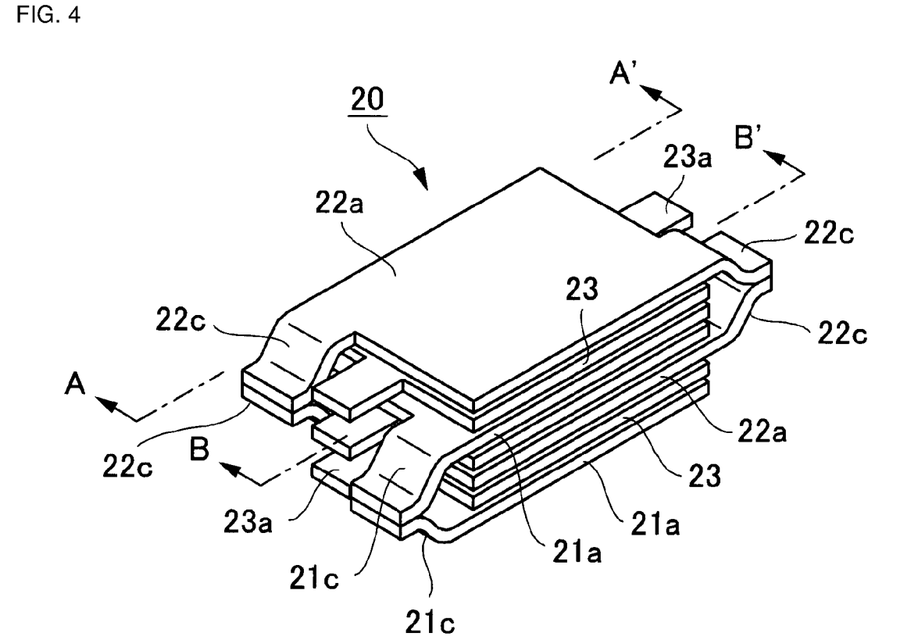
FIG. 4 is a perspective view showing a state in which the electrodes and separators of the electrochemical device are laminated with projections of the electrodes being connected.

FIG. 4 shows a state in which the vertically aligned projections 21c of the electrodes 21, as well as the vertically aligned projections 22c of the electrodes 22, are connected to each other. The connections between the projections 21c and between the projections 22c can be performed by, for example, a method such as parallel resistance welding, spot welding, ultrasonic welding, or laser welding. The projections 21c of the electrodes 21 of one of the polarities are connected on the left side of the upper side and the right side of the lower side as shown in FIG. 2 so that the electrodes 22 and the separators 23 disposed between the respective electrodes 21 are supported by a diagonal crossing manner. Similarly, the projections 22c of the electrodes 22 of the other polarity are connected on the right side of the upper side and the left side of the lower side as shown in FIG. 2 so that the electrodes 21 and the separators 23 disposed between the respective electrodes 22 are supported by a diagonal crossing manner in a direction crossing that of the electrodes 21. The connections between the projections 21c of the electrodes 21 and between the projections 22c of the electrodes 22 can stably support the laminated state of the electrodes 21 and 22 and the separators 23, thereby preventing deviation of the overlap positions.

In addition to the connections between the vertically aligned projections 21c of the electrodes 21 and between the vertically aligned projections 22c of the electrodes 22, the projections 23a of the separators 23 may be connected to each other. The connection between the projections 23a of the separators 23 can further restrict the movement of the electrodes 21 and 22 and the separators 23, thereby enhancing the effect of preventing deviation in the overlap positions.

Figure 5:
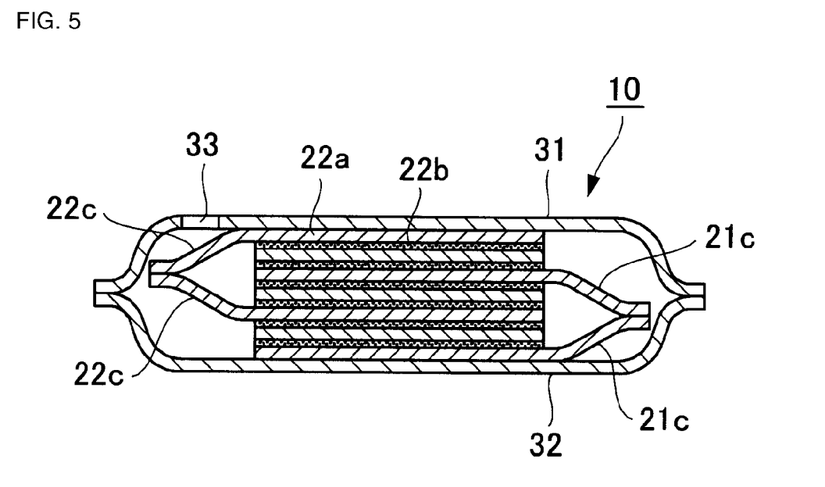
FIG. 5 is a sectional view taken along arrow line A-A' in FIG. 4, showing a state in which the electrodes and separators of the electrochemical device are laminated with projections of the electrodes being connected, and sealed with a sealing member.
Figure 6:
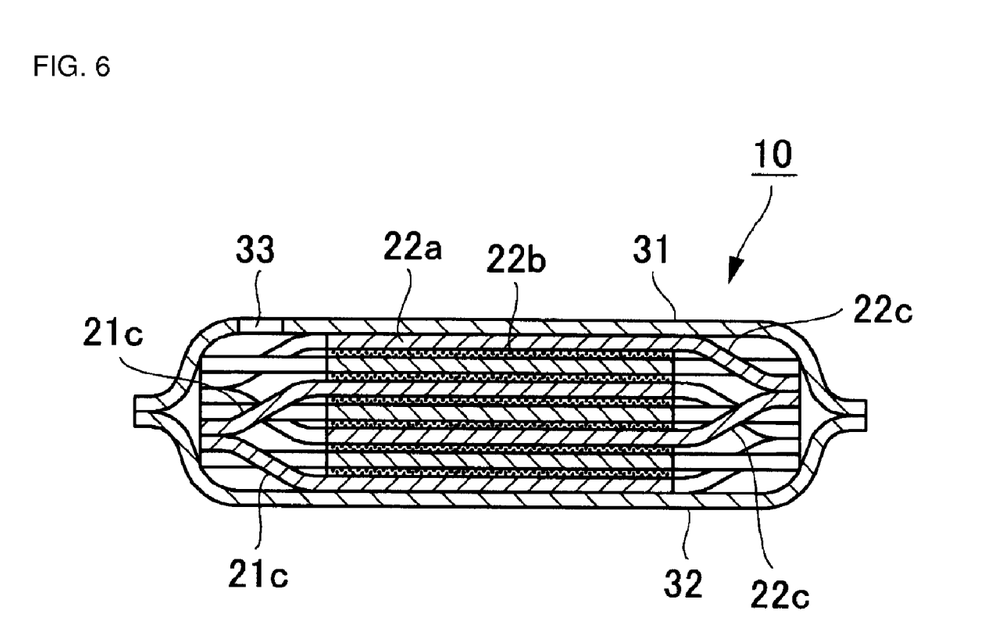
FIG. 6 is a sectional view taken along arrow line B-B' in FIG. 4, showing a state in which the electrodes and separators of the electrochemical device are laminated with projections of the electrodes being connected, and sealed with a sealing member.

FIGS. 5 and 6 each show a state in which the laminate 20 is covered with the sealing members 31 and 32. FIG. 5 is a sectional view taken along arrowhead line A-A' in FIG. 4, and FIG. 6 is a sectional view taken along arrowhead line B-B' in FIG. 4. The electrodes 21 and 22 are disposed opposite to each other with the separators 23 provided between the respective electrodes 21 and 22, and the polarizable electrodes 21b and 22b are formed on the opposing inner surfaces of the electrodes 21 and 22, respectively. The projections 21c of the electrodes 21 of one of the polarities, which are connected on the right side of the lower side as shown in FIG. 2, are positioned below one of the openings 33 of the sealing member 31 as shown in FIG. 6 to form a terminal exposed through the opening 33. The projections 22c of the electrodes 22 of the other polarity, which are connected on the left side of the lower side as shown in FIG. 2, are positioned below the other opening 33 of the sealing member 31 as shown in FIG. 5 to form a terminal exposed through the opening 33. FIGS. 5 and 6 show a state in which each of the openings 33 is separated from the projections 21c or 22c which constitute each terminal. However, actually, the inner periphery of each opening 33 closely adheres to the corresponding projections 21c or 22c because each of the electrodes 21 and 22 and the separators 23 is composed of a thin sheet. In this case, the inner periphery of each opening 33 of the sealing member 31 can be bonded or welded to the corresponding projections 21c or 22c. In addition, openings 34 can be provided in the other sealing member 32 so that the projections 21c can be exposed from one of the openings of one of the sealing members 31 and 32, and the projections 22c can be exposed from one of the openings of the other sealing member 32 or 31. Further, the projections 21c and 22c can be projected from connection edges between the sealing members 31 and 32 to form terminals.

The sealing members 31 and 32 are not particularly limited as long as they have moisture impermeability and sufficient strength. However, for example, a metal foil-laminated synthetic resin film is preferably used. As a metal foil, an aluminum foil is preferably used. Preferred examples of a synthetic resin include polypropylene, nylon, polyethylene terephthalate (PET), polyethylene, an ethylene-vinyl acetate copolymer resin, and a laminate thereof (for example, composed of a nylon base material, polypropylene as a sealant laminated on the base material, and polyethylene terephthalate, polyethylene, or ethylene-vinyl acetate copolymer resin films which hold the base material and the sealant therebetween). When the sealing members 31 and 32 are bonded together by heat welding, a heat-weldable resin layer is preferably provided on at least the inner surface of each of the sealing members 31 and 32.

Before the laminate 20 is sealed with the sealing members 31 and 32, an electrolyte is filled between the respective electrodes 21 and 22 of the laminate 20. Although the electrolyte is not particularly limited, for example, tetraethylammonium tetrafluoroborate ($Et_4NBF_4$) or a compound represented by the following formula (i) can be used.

$$[R_1R_2R_3R_4N]^+X^- \qquad (i)$$

wherein $R_1$ to $R_4$ each represent a C1-C6 alkyl group which may contain an unsaturated bond, an ether bond, an amide bond, or an ester bond, or a C4-C6 cycloalkyl group which may contain a nitrogen atom in its molecule, and X represents an anion such as $ClO_4^-$, $BF_4^-$, $PF_6^-$, $(CF_3SO_2)_2N^-$, $CF_3SO_4^-$, or $C_2F_5SO_4^-$.

The electrolyte is dissolved in a solvent such as propylene carbonate (PC), acetonitrile, methoxyacetonitrile, 3-methoxypropionitrile, γ-butyrolactone, butylene carbonate, dimethyl carbonate, ethylmethyl carbonate, ethylene carbonate, sulfolane, or 3-methylsulfolane to form an electrolytic solution. The electrolytic solution is filled between a pair of the electrodes 21 and 22 of different polarities. When water enters the electrolyte containing fluorine, hydrofluoric acid is produced, and the current collectors 21a and 22a may be corroded. Therefore, it is necessary to closely seal the laminate 20 with the sealing members 31 and 32.

In the thus-prepared electrochemical device (in this embodiment, the electric double layer capacitor) 10, when positive and negative voltages are applied to the terminals where the projections 21c and 22c are exposed, in the case of an anode, negative ions are accumulated on the surfaces of the polarizable electrodes 21b and 22b, which are composed of a porous material such as activated carbon with a large surface area or carbon fibers, while in the case of a cathode, positive ions are accumulated, forming an electric double layer. The electrochemical device 10 functions as a capacitor with large capacity and thus can be used as a chargeable/dischargeable battery.

Next, a method of manufacturing the electrochemical device 10 is described with reference to FIGS. 7 and 8.

Figure 7:
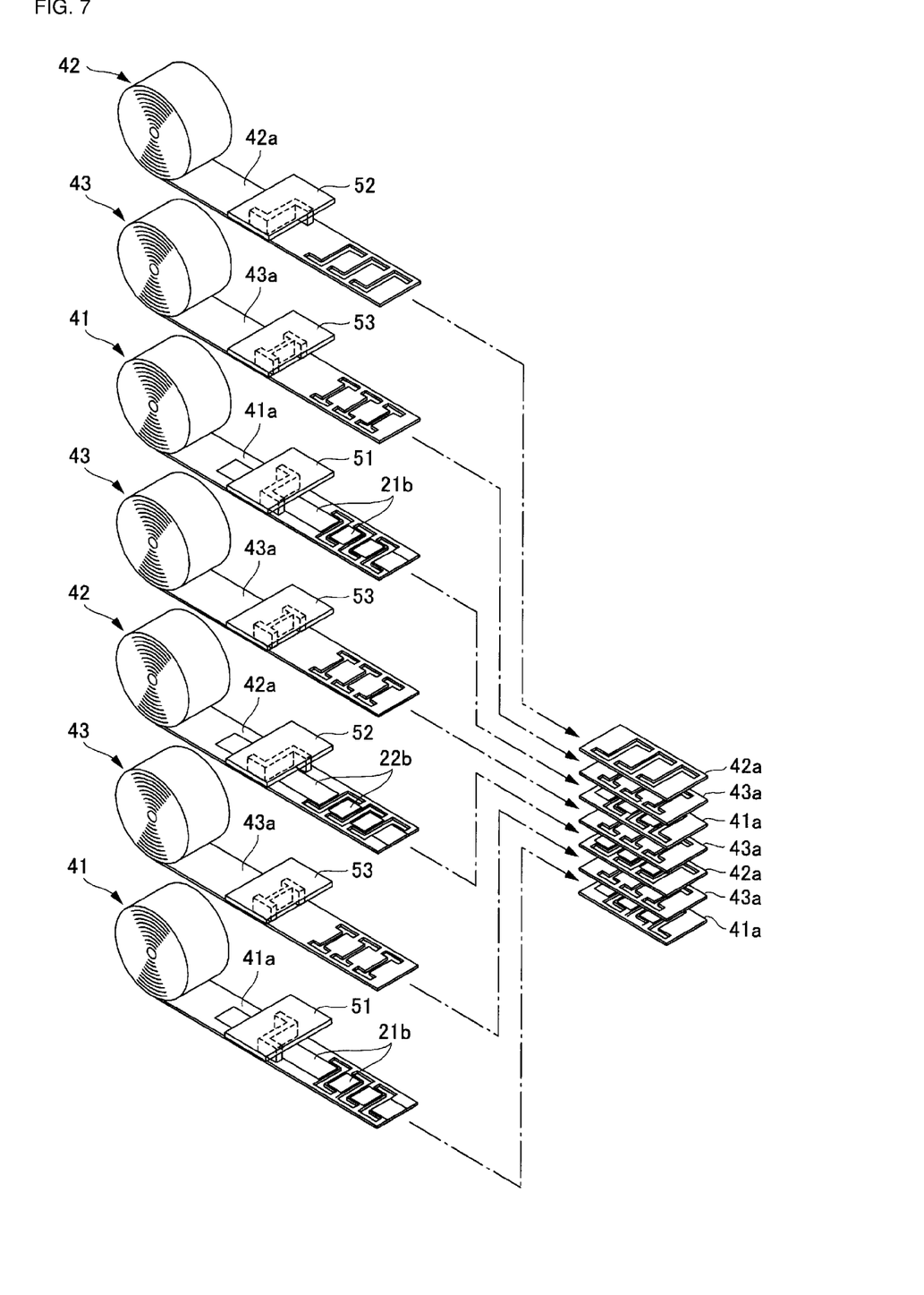
FIG. 7 is a perspective view showing a method of laminating sheets in a process of manufacturing the electrochemical device.

In FIG. 7, reference numeral 41 denotes a first current collector roll of a first current collector sheet 41a for forming the current collectors 21a of the electrodes 21 of one of the polarities; reference numeral 42, a second current collector roll of a second current collector sheet 42a for forming the current collectors 22a of the electrodes 22 of the other polarity; and reference numeral 43, a separator roll of a separator sheet 43a for forming the separators 23. This embodiment uses two first current collector rolls 41, two second current collector rolls 42, and three separator rolls 43.

The polarizable electrodes 21b and 22b, which are composed of a porous material such as activated carbon with a large surface area or carbon fibers, are formed by coating on the central portions in the width direction of the first current collector sheet 41a and the second current collector sheet 42a taken out from the first current collector roll 41 and the second current collector roll 42, respectively. In this case, the polarizable electrodes 21b and 22b are formed on both surfaces of the first current collector sheet 41a and the second current collector sheet 42a, respectively, which are disposed in an intermediate portion of the laminate 20. On the other hand, the polarizable electrodes 21b and 22b are formed on only the inner surfaces of the first current collector sheet 41a and the second current collector sheet 42a, respectively, which are disposed on the outer surfaces of the laminate 20. The separator sheet 43a taken out from the separator roll 43 is disposed between the first and second current collector sheets 41a and 42a.

The first current collector sheet 41a, the second current collector sheet 42a, and the separator sheet 43a are punched with dies 51, 52, and 53, respectively, so as to have the respective shapes shown in FIG. 7.

The thus-formed sheets 41a, 42a, and 43a are laminated as shown in FIG. 7. Although not shown in the drawing, actually, sheets for forming the respective sealing members 31 and 32 are further disposed on the respective outer surfaces of the uppermost second current collector sheet 42a and the lowermost first current collector sheet 41a to cover the outer surfaces of the laminate of the sheets 41a, 42a, and 43a.

Figure 8A:
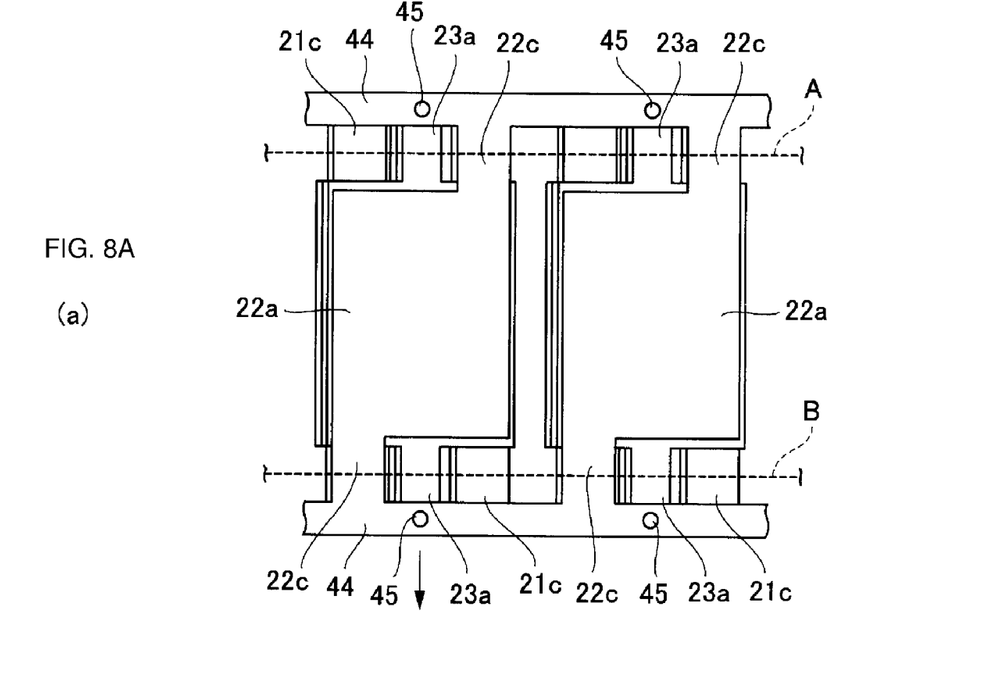
FIG. 8A is a plan view showing a laminated state of sheets in a process of manufacturing the electrochemical device.

As shown in FIG. 8A, for example, the second current collector sheet 42a punched with the die 52 has the current collectors 22a, the projections 22c projecting from the right sides of the upper sides of the respective current collectors 22a, and the projections 22c projecting from the left sides of the lower sides of the respective current collectors 22a, the projections 22c being connected to each other through the connection straps 44. Each of the connection straps 44 has feed holes 45 at predetermined intervals, for feeding the sheet while controlling the position. Similarly, in the first current collector sheet 41a and the separator sheet 43a, the projections 21c and 23a are connected through the respective connection straps 44 so that the sheets are fed using the feed holes 45 provided in the straps 44 under position control. Therefore, in an embodiment of the present invention, each of the sheets 41a, 42a, and 43a is conveyed while both ends thereof are supported by the connection straps 44, and thus can be stably conveyed and correctly positioned. In this state, the vertically aligned projections 21c as well as the vertically aligned projections 22c are connected together by a method such as parallel resistance welding, spot welding, ultrasonic welding, or laser welding.

Then, the sheets of the respective sealing members 31 and 32 (not shown) are applied to the outer surfaces of the laminate to cover it. Then, the laminate is cut along imaginary lines A and B shown in FIG. 8A to form the laminate 20 as shown in FIG. 8B. As a result, the laminate can be separated into individual devices. The electrolyte may be charged before or after the laminate is separated into individual devices. After the electrolyte is charged, the sealing members 31 and 32 are sealed, and, if the laminate is not yet separated into individual devices, the laminate is separated into individual devices to manufacture the electrochemical device 10.

Therefore, the electrochemical device 10 of this embodiment of the present invention can be manufactured, with high workability, by a roll-to-roll process capable of stably supplying the sheets and accurately positioning and laminating the sheets.

In the present disclosure where conditions and/or structures are not specified, the skilled artisan in the art can readily provide such conditions and/or structures, in view of the present disclosure, as a matter of routine experimentation. Also, in the present disclosure, the numerical numbers applied in embodiments can be modified by a range of at least ±50% in other embodiments, and the ranges applied in embodiments may include or exclude the endpoints.

EXAMPLE

Figure 8B:
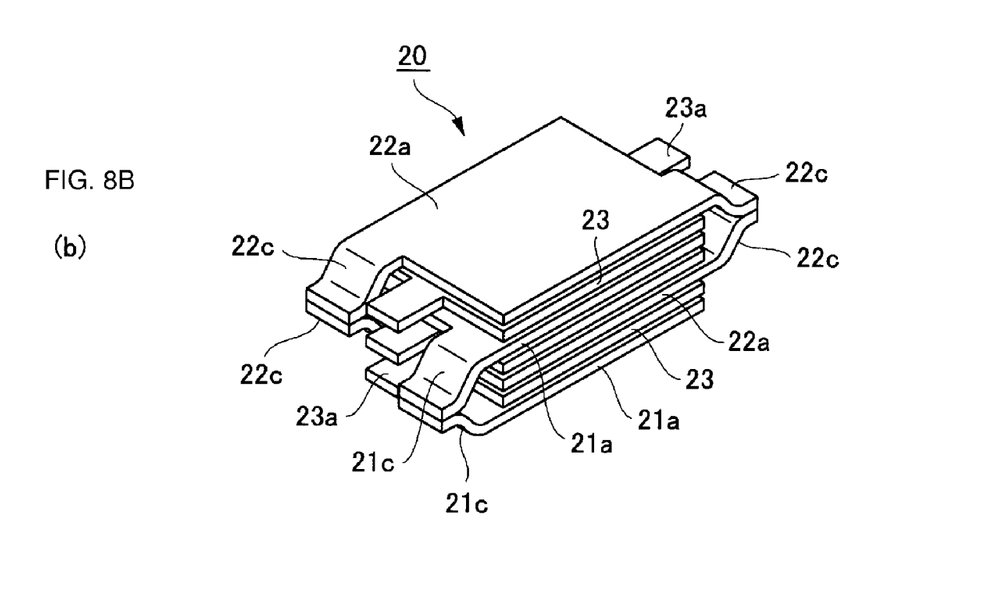
FIG. 8B is a perspective view showing a separated device.

The electrochemical device (electric double layer capacitor) shown in FIGS. 1 to 6 was manufactured by the method shown in FIGS. 7 and 8.

An aluminum foil (manufactured by Toyo Alumi Co., Ltd.) having a thickness of 22 μm was used as each of the current collector sheets 41a and 42a. The sheets 41a and 42a were punched with the dies 51 and 52, respectively, so that the current collectors 21a and 22a of 23.5 mm×15 mm in size were formed when the sheets were finally separated into devices as shown in FIG. 8. The size of the projections 21c and 22c of the current collectors was 3.5 mm×4 mm.

A porous polyolefin film (manufactured by Nippon Sheet Glass Company, Ltd.) composed of a polyolefin containing an inorganic filler was used as the separator sheet 43a. The sheet 43a was punched with the die 53 as shown in FIG. 7 so that the separators 23 of 23.5 mm×16 mm in size were formed. The size of the projections 23c of the separators was 3 mm×4 mm.

An aluminum laminate film having a thickness of 105 μm and including nylon of 25 μm in thickness, aluminum of 40 μm in thickness, and polypropylene of 40 μm in thickness was used as each of the sealing members 31 and 32. The sheet was punched in the size of 32 mm×24 mm to form the sealing members 31 and 32.

The polarizable electrodes were formed as layers of 16.5 mm×15 mm×0.1 mm on one or both the surfaces of the respective current collectors 21a and 22a by applying a paste which was prepared by kneading porous carbon, an elastomer binder, carbon black, and carboxymethyl cellulose at a weight ratio of 100:3:5:2 and then adding water to obtain a paste concentration of 37%.

The thus-formed sheets were laminated, the vertically aligned projections 21c as well as the vertically aligned projections 22c were welded together, and an organic electrolytic solution "Powerelek" (trade name, manufactured by Sanyo Chemical Industries, Ltd.) was filled, followed by sealing with the sealing members 31 and 32 to prepare an electrochemical device (electric double layer capacitor).

The capacitance of the resultant electrochemical device (electric double layer capacitor) was measured by the constant-current discharge method described in EIAJ RC-2377. Also, the equivalent series resistance was measured by the alternating-current impedance measurement method described in EIAJ RC-2377.

As a result, the capacitance was 1.6 F, and the equivalent series resistance (1 kHz) was 530 mΩ.

In the above, four electrodes were used. However, the number of electrodes may be any integer of four or higher such as 5, 6, 7, etc. (in an embodiment, the number may be an even number). Even when the number of electrodes is more than four, the electrodes can still be laminated in a manner described above by alternately changing the positions of the projections in the lamination direction and connecting together the projections aligned in the lamination direction. The connected portions are overlapped as viewed in a direction perpendicular to the lamination direction, and positional deviation can be minimized.

The present application claims priority to Japanese Patent Application No. 2007-192158, filed Jul. 24, 2007, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. An electrochemical device comprising:
four or more electrodes which are laminated with separators provided between the respective electrodes;
an electrolyte filled between the respective electrodes; and
a sealing member which covers the periphery,
wherein the electrodes are arranged so that the polarities alternately change in the lamination direction, and each of the electrodes has projections projecting from diagonally opposite positions on the peripheral edge so that the positions of the projections of the electrodes of different polarities are opposite to each other in the lateral direction and the projections of the electrodes of the same polarity are aligned and welded to each other, thereby constituting four welded projections of the electrodes to support by the electrodes of one of the polarities diagonally in a first direction the electrode of the other polarity and the separators attached thereto interposed between the electrodes of the one of the polarities, and to support by the electrodes of the other polarity diagonally in a second direction crossing the first direction the electrode of the one of the polarities and the separators attached thereto interposed between the electrodes of the other polarity,
each of the separators has projections which are positioned between the projections of the adjacent electrodes of different polarities, and
the longitudinal length of each of the electrodes and separators including the respective projections is the same.

2. The electrochemical device according to claim 1, wherein the projections of the respective separators are aligned in the lamination direction and connected to each other.

3. The electrochemical device according to claim 2, wherein the sealing member has openings for exposing therethrough the respective connection portions of the projections of the electrodes for forming terminals, said openings being aligned with the projections of the electrodes in the lamination direction.

4. The electrochemical device according to claim 2, wherein each of the electrodes includes a current collector having a shape with the projections and a polarizable electrode formed on a surface thereof, and the polarizable electrodes are formed on the overlap surfaces of the electrodes of different polarities.

5. The electrochemical device according to claim 1, wherein the sealing member has openings for exposing therethrough the respective welded portions of the projections of the electrodes for forming terminals, said openings being aligned with the projections of the electrodes in the lamination direction.

6. The electrochemical device according to claim 5, wherein each of the electrodes includes a current collector having a shape with the projections and a polarizable electrode formed on a surface thereof, and the polarizable electrodes are formed on the overlap surfaces of the electrodes of different polarities.

7. The electrochemical device according to claim 1, wherein each of the electrodes includes a current collector having a shape with the projections and a polarizable electrode formed on a surface thereof, and the polarizable electrodes are formed on the overlap surfaces of the electrodes of different polarities.

8. The electrochemical device according to claim 1, which is an electrochemical capacitor.

9. An electrochemical device comprising:
four or more electrodes which are laminated with separators provided between the respective electrodes, each electrode having a substantially rectangular shape and having projections extending outward from diagonally opposite positions on the perimeter edge of each electrode of substantially rectangular shape;
an electrolyte filled between the respective electrodes; and
a sealing member which encloses the laminated electrodes with the separators,
wherein the electrodes are stacked so that the positions of the projections of the electrodes alternately change in the lamination direction, and the projections of the electrodes aligned in the lamination direction have the same polarity and are welded to each other, thereby constituting four welded projections of the electrodes to support by the electrodes of one of the polarities diagonally in a first direction the electrode of the other polarity and the separators attached thereto interposed between the electrodes of the one of the polarities, and to support by the electrodes of the other polarity diagonally in a second direction crossing the first direction the electrode of the one of the polarities and the separators attached thereto interposed between the electrodes of the other polarity,
each of the separators has projections which are positioned between the projections of the adjacent electrodes of different polarities with respect to the lamination direction, and
the longitudinal length of each of the electrodes and separators including the respective projections is the same.

10. The electrochemical device according to claim 9, wherein the even number of electrodes is four, and each electrode has two projections.

11. The electrochemical device according to claim 9, wherein the projections of the respective separators are aligned in the lamination direction and connected to each other.

12. The electrochemical device according to claim 9, wherein the sealing member has openings for exposing therethrough the respective welded portions of the projections of the electrodes for forming terminals, said openings being aligned with the projections of the electrodes in the lamination direction.

13. The electrochemical device according to claim 9, wherein each of the electrodes is comprised of a current collector having a shape with the projections and a polarizable electrode formed on both sides of the current collector, wherein the polarizable electrodes are substantially overlapped as viewed in the lamination direction.

14. The electrochemical device according to claim 9, which is an electrochemical capacitor.

* * * * *

UNITED STATES PATENT AND TRADEMARK OFFICE
CERTIFICATE OF CORRECTION

| | | |
|---|---|---|
| PATENT NO. | : 8,248,756 B2 | Page 1 of 1 |
| APPLICATION NO. | : 12/179510 | |
| DATED | : August 21, 2012 | |
| INVENTOR(S) | : Naoto Hagiwara and Katsuei Ishida | |

It is certified that error appears in the above-identified patent and that said Letters Patent is hereby corrected as shown below:

Please correct "Higawara et al." in section (12) on the front page to read "Hagiwara et al.".
Please correct "Naoto Higawara" in section (75) on the front page to read "Naoto Hagiwara".

Signed and Sealed this
Second Day of October, 2012

David J. Kappos
*Director of the United States Patent and Trademark Office*